United States Patent [19]

Peters, II et al.

[11] 4,325,701

[45] Apr. 20, 1982

[54] PROTECTIVE DEVICE

[76] Inventors: James K. Peters, II, 4472 Toledo, Detroit, Mich. 48209; Gus Metros, 21150 W. Outer Dr., Dearborn, Mich. 48124

[21] Appl. No.: 89,141

[22] Filed: Oct. 29, 1979

[51] Int. Cl.[3] ........................ B63H 21/26; F16F 15/00

[52] U.S. Cl. .................................... 440/113; 440/900; 70/163; 70/232; 248/552

[58] Field of Search ................ 440/113, 900; 248/551, 248/552; 70/163, 232

[56] References Cited

U.S. PATENT DOCUMENTS

| | | | |
|---|---|---|---|
| 2,479,300 | 8/1949 | Binz | 248/552 X |
| 2,930,218 | 3/1960 | Ashmore | 248/552 |
| 3,206,955 | 9/1965 | Horovitz | 70/163 |
| 3,589,204 | 6/1971 | Langley | 440/900 X |
| 4,228,983 | 10/1980 | Bowman | 70/232 X |

*Primary Examiner*—Joseph J. Rolla

*Attorney, Agent, or Firm*—Gifford, VanOphem, Sheridan & Sprinkle

[57] ABSTRACT

A device is provided for use in conjunction with a marine vessel having an engine, a transmission connected to the engine and having a portion extending exteriorly of the boat and an out drive which is connected to the exteriorly extending portion of the transmission by removable fasteners. The device of the present invention prevents the unauthorized removal of the out drive from the transmission. The instant device comprises a housing having a top wall, a back wall and opposing side walls which extend downwardly from the top wall and on opposite sides thereof. The top wall of the housing includes a slot through which the mooring eye on the out drive is positioned and, in doing so, the threaded fasteners which connect the out drive to the transmission are inaccessibly positioned between the housing side walls. The housing itself is removably secured to the out drive by a padlock having its bolt extending through the mooring eye in order to permit removal of the out drive only by authorized personnel.

5 Claims, 3 Drawing Figures

PROTECTIVE DEVICE

BACKGROUND OF THE INVENTION

I. Field of the Invention

The present invention relates generally to protective devices and, more particularly, to a protective device which prevents the unauthorized removal of an out drive from a marine vessel.

II. Description of the Prior Art

Many types of marine vessels are power driven and thus have an engine contained within the hull of the vessel. The engine is operatively connected to a transmission and a portion of the transmission extends exteriorly and rearwardly of the vessel.

Although in some cases a propeller is directly connected to the output shaft from the transmission, in many types of marine vessels an out drive is used between the transmission and the propeller in order to increase the submersion of the propeller in the water. Conventionally, the out drive includes a mounting flange which registers with and abuts against a like mounting flange on the exteriorly extending portion of the transmission and these mounting flanges are secured together by bolts for other types of removable fasteners. The use of removable fasteners, of course, is necessary in order to enable removal of the out drive as required for maintenance and/or repair.

Because the out drive is mounted and secured to the transmission outside the vessel, it can be easily removed from the vessel by unauthorized persons and without the need to gain access to the interior of the vessel. Because of this, the theft of the out drive from the vessel is a common occurrence in marinas and other places where marine vessels are moored.

SUMMARY OF THE PRESENT INVENTION

The present invention provides a simple and inexpensive protective cover which prevents the removal of the out drive from a marine vessel by unauthorized persons.

In brief, the device according to the present invention comprises a housing having a top wall, a back wall and a pair of side walls depending downwardly from opposite sides of the top wall. The housing, however, is open on both its bottom and its front and is constructed of a heavy duty material, such as steel.

A slot is formed through the top of the housing so that the housing can be positioned over the out drive on the marine vessel and so that the upwardly protruding mooring eye on the out drive is positioned through the housing slot. The housing is then locked to the out drive by a padlock having its bolt extending through the mooring eye. The width of the slot, moreover, is less than the width of the padlock so that the housing is effectively secured to the out drive.

With the housing secured to the out drive in the above described fashion, at least a portion of the removable fasteners which secure the out drive to the transmission are positioned between the side walls of the housing. Moreover, the side walls of the housing are in close proximity to these removable fasteners and thus effectively prevent access to the removable fasteners with tools, such as a wrench, designated to remove them. When authorized removal of the out drive is desired, however, the housing can be rapidly removed from the out drive by unlocking the padlock and thereafter lifting the housing.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
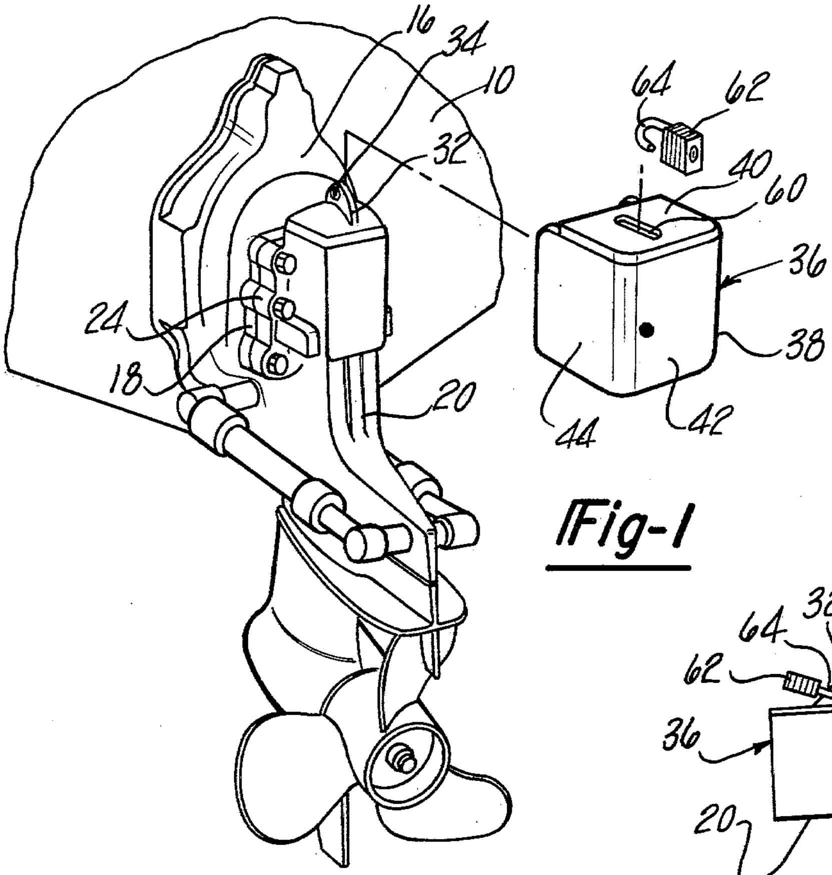
FIG. 1 is an exploded, fragmentary perspective view illustrating the device of the present invention secured to a marine vessel.
Figure 2:
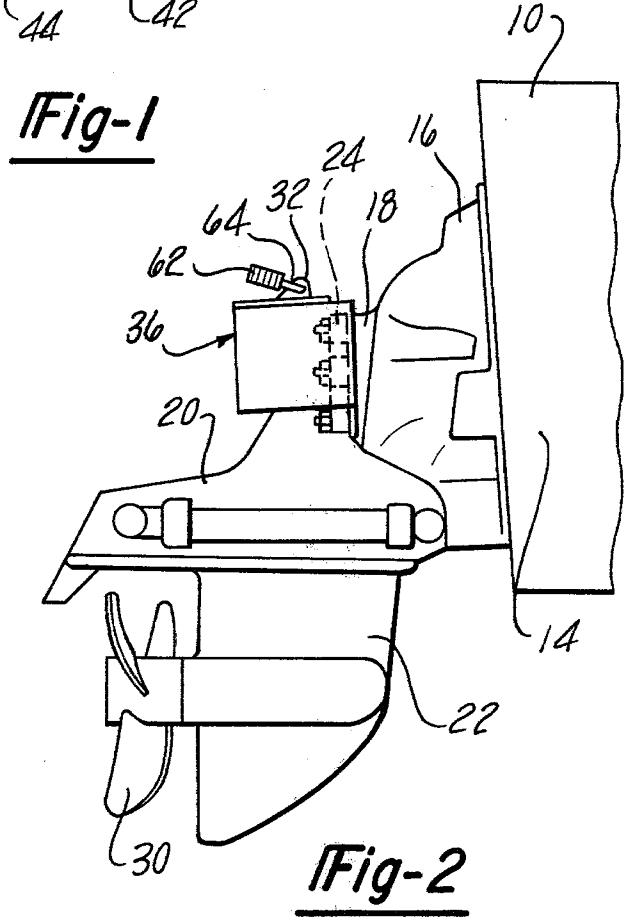
FIG. 2 is a fragmentary side view showing the device of the present invention secured to a marine vessel.

With reference first to FIGS. 1 and 2, a marine vessel 10 is thereshown having an engine 12 (illustrated diagrammatically) operatively connected with a transmission 14. A portion 16 of the transmission 14 extends rearwardly and exteriorly of the vessel 10. A generally annular mounting flange 18 is formed about the rear end of the transmission outwardly extending portion 16.

Still referring to FIGS. 1 and 2, an out drive 20 having an elongated housing 22 is thereshown. An annular mounting flange 24 on the out drive 20 registers with the mounting flange 18 on the transmission outwardly extending portion 16 and these flanges 18 and 24 are secured together by bolts 26 spaced around the mounting flanges 24 and 18. Typically, the bolts are slidably positioned through apertures in the out drive mounting flange 24 and threadably engaged registering bores in the transmission flange 18 so that the heads of the bolts 26 face rearwardly of the vessel 10. Alternatively, of course, the transmission 14 could have studs secured to it which extend through bores on the out drive mounting flange 24. In this event, the out drive 20 is secured to the transmission 14 by nuts which engage the studs.

With the out drive 20 connected to the transmission 14, the out drive housing 22 extends generally downwardly and, at its lower end, has a propeller 30 which extends rearwardly of the out drive 20 and thus rearwardly of the vessel 10. Appropriate power train means (not shown) are, of course, provided through both the transmission 14 and out drive 20 so that the engine 12 is or can be operatively connected to the propeller 30. This power train forms no part of the present invention, and therefore, will not be described.

Still referring to FIGS. 1 and 2, an out drive housing 22 includes a mooring eye 32 which extends upwardly from the top and the out drive housing 22 and adjacent the out drive mounting flange 24. The mooring eye 32 includes an opening 34 and is commonly used to moor the vessel 10 to a dock. Additionally, the mooring eye 32 is used as a tie point to both lift and lower the out drive 20.

Figure 3:
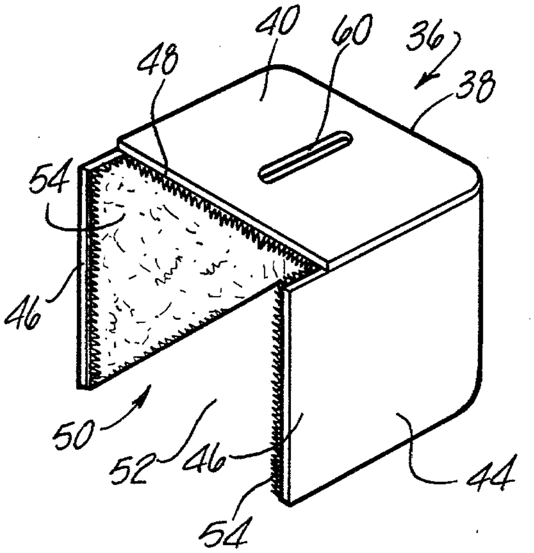
FIG. 3 is a perspective view of the device according to the present invention.

With reference now to FIGS. 1 and 3, the protective device 36 according to the present invention is thereshown which prevents the unauthorized removal of the out drive 20 from the outwardly extending portion 16 of the transmission 14. The device 36 comprises a housing 38 having a top wall 40, a back wall 42 and a pair of side walls 44. The side walls 44 depend downwardly from the top wall 40 and forwardly of the rear wall 42. A portion 46 of each side wall 44 also extends forwardly of the front edge 48 of the top wall 40.

The top, back and side walls 40, 42 and 44, respectively, are generally rectangular in shape and are constructed of a heavy duty material, such as steel plating. In addition, the top, back and side walls of the housing 38 are fixedly secured together along their abutting edges by any suitable means, such as welding, so that disassembly of the housing 38 is not possible without destruction of the housing 38.

Both the front 50 and the bottom 52 of the housing 38 are open for a reason to be shortly described. In addition, the facing surfaces of the side walls 44, the bottom surface of the top wall 40 and the front surface of the back wall 42 are covered with a resilient material 54, such as nylon mesh, also for a reason to be subsequently described.

With reference now to FIGS. 1–3, an elongated slot 60 is formed through the housing top wall 40. Both the housing 38 and the slot 60 are dimensioned so that the housing 38 can be positioned over the top of the out drive housing 22, as shown in FIG. 2, and, in doing so, the mooring eye 32 protrudes upwardly through the slot 60. Simultaneously, at least a portion of the bolts 26 are positioned in between the housing side walls 44 and, moreover, the side walls 44 are in close proximity to the bolts 26. Thus, the housing 38 prevents access to the bolts 26 either manually or with tools and thus prevents the unauthorized removal of the out drive 20.

With the housing 38 positioned over the out drive housing 22 in the above described fashion, the device 10 is locked to the out drive 20 by a padlock 62 having its bolt 64 positioned through the opening 34 of the mooring eye 32. The housing slot 60 is sufficiently narrow to prevent the padlock 62 from passing through it. Moreover, when authorized access to the out drive mounting bolts 26 is desired, the padlock 62 is simply removed in the conventional fashion and the device 10 is thereafter lifted up from the out drive housing 22. Lastly, the resilient coating on the interior walls of the housing 38 is designed to prevent noise and abrasion caused by vibrations between the device 10 and the out drive 20 during operation of the marine vessel.

From the foregoing, it can be seen that the present invention provides a simple, inexpensive and yet totally effective means for preventing the unauthorized removal of the out drive from a marine vessel.

Having described our invention, however, many modifications thereto will become apparent to those skilled in the art to which it pertains without deviation from the spirit of the invention as defined by the scope of the appended claims.

We claim:

1. For use in conjunction with a marine vessel having an engine, transmission means operatively connected with the engine and having a portion which extends exteriorly of the vessel, and an out drive having a housing with a propeller rotatably mounted in the housing, said out drive housing having a mounting flange which registers with a mounting flange on the exteriorly extending portion of the transmission, said out drive being secured to said transmission means by removable fasteners extending through one of said mounting flanges and into the other mounting flange, said out drive having a mooring eye protruding from its top, a device to prevent the unauthorized removal of the out drive from the transmission means, said device comprising:

a housing comprising a plurality of walls fixedly secured together, one of said walls including a slot dimensioned to receive the mooring eye therethrough, said housing adapted to be positioned on the top of said out drive so that said mooring eye protrudes through said slot and so that at least a portion of the removable fasteners are positioned in between at least two of said walls and covered by said housing to thereby prevent the removal of the fasteners, and means for removably locking said housing to said mooring eye against unauthorized removal.

2. The invention as defined in claim 1 wherein said housing includes a top wall, a back wall and a pair of side walls which depend downwardly from said top wall on opposite sides thereof and forwardly of said back wall, said removable fasteners being positioned between said housing side walls.

3. The invention as defined in claim 2 wherein said locking means further comprising a padlock having a bolt positioned through the mooring eye after said housing is positioned onto said out drive.

4. The invention as defined in claim 2 and further comprising a resilient lining on the interior of the housing.

5. The invention as defined in claim 2 wherein the removable fasteners are bolts having bolt heads and wherein the bolt heads are positioned between the housing side walls.

* * * * *